Patented Feb. 7, 1939

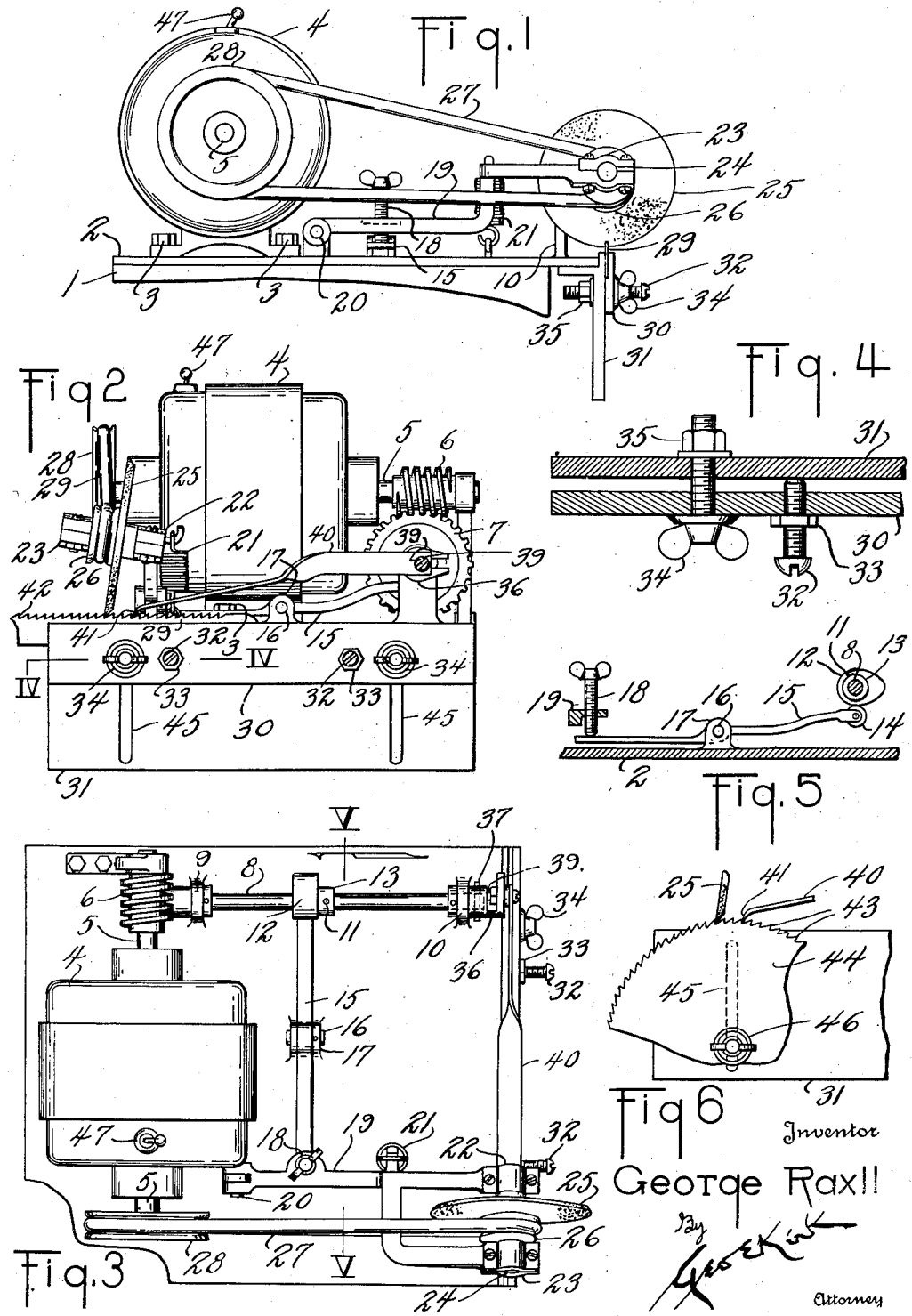

2,146,686

UNITED STATES PATENT OFFICE 2,146,686

AUTOMATIC CUTTING TOOL

George Raxll, Toledo, Ohio

Application May 21, 1937, Serial No. 143,931

1 Claim. (Cl. 76—40)

This invention relates to abrading, cutting or grinding devices.

This invention has utility when incorporated in an automatic saw sharpener tool as for hack saw blades, grinding disks or wheels.

Referring to the drawing:

Fig. 1 is a side elevation of an embodiment of the invention;

Fig. 2 is a view of the device from the right of Fig. 1;

Fig. 3 is a plan view, with parts broken away;

Fig. 4 is a section on the line IV—IV, Fig. 2, of a mounting device for the work;

Fig. 5 is a section on the line V—V, Fig. 3, of the step device for the tool; and Fig. 6 is a fragmentary view of the pusher device for the work disk.

Upon a support or base 1 may be mounted platform or bed plate 2, with which engage bolts 3 mounting electric motor 4 as a small power supply unit having shaft 5 therethrough, one way from the motor including worm 6 in mesh with worm wheel 7 as a speed reduction drive for shaft 8 mounted in bearings 9, 10. This shaft 8 has connected thereto by set screw 11 cam 12. This set screw 11 is in collar 13 fixed with this cam 12. The cam 12 is engaged by roller 14 (Fig. 5) carried by lever 15 having fulcrum pin 16 mounted in ears 17 rising from the platform 2. This lever 15 extends beyond this fulcrum pin 16 and it is there engaged by set screw 18 having thread engagement with lever 19. The lever 15 is a first class lever and this lever 19 is a third class lever having fulcrum pin 20 fixed with the platform 2 adjacent the motor 4, said lever extending away therefrom. This lever 19 is normally held as to the set screw 18 against the lever 15 by tension spring 21 rising from the platform 2.

The lever 19 has fork free end providing bearings 22, 23, for shaft 24 mounting abrading disk or cutting tool 25 adjacent pulley 26, about which extends belt 27 as transmission means from pulley 28 on the shaft 5 as protruding from the motor 4 oppositely from the worm 6. Accordingly, there is common drive for the step device operation of the levers in tilting this cutting tool 25 as such tool is driven. The forked termini or bearings 22, 23, of this lever 19 are disposed to give this cutting tool 25 a pitch or incline for undercut of teeth on the work, which work herein may be saw blade 29 in guided position by plate 30 adjusted as to back plate 31 fixed with the platform 2. This plate 30 is shown carrying set screws 32 with lock nuts 33 determining clearance between the plates 30, 31, for the clamping action effected by wing bolts 34 as acting on nuts 35 for positioning the work 29 to be snugly held but free to be guided or shifted as so held in alignment past the position for being acted upon by the cutting tool 25.

This shaft 8 remote from the bearing 9 has thereon adjacent bearing 10 a sleeve 36 anchored with the shaft 8 by pin 37. This sleeve 36, as extending beyond the end of the shaft 8, carries fork 38 slotted into or past the center of the shaft 8 so that wrist pin 39 may be adjusted therein for throw from approximate zero. This wrist pin is engaged by step device or pusher bar 40 in which the wrist pin 39 may rotate. This bar 40 extends over to and by gravity has claw terminus 41 to engage teeth 42 in the work 29, or teeth 43 in disk article of work 44.

In the instance for commonly varying types of blades or lineal articles of work, the wing bolts 34 may have their position varied in clearance as to the platform 2 by adjusting the position of these wing bolts 34 in slots 45. If rotary article of work as circular saw 44 be the matter of upkeep or sharpening, bushing 46 is mounted on the wing bolt 34 as in the slot 45 when the plate 30 has been removed. This clamping is a provision for a bearing concentric of this circular saw 44 so that the pusher 41 may progress the work, say as adjusted by the forks, for the pusher 40 so that at the pitch of the teeth the setting forward may be a single tooth or a multiple thereof. A positioning of the rotary cutter 25 and its wedge face is such that there may be effective cutting or sharpening in the work, and as positioned, the progress may be hereunder for running the work through this automatic tool, whether such be lineal or circular.

In the operation hereunder, an article of work as a hack saw blade or circular saw is brought into position on the mounting device for initiating operation. With switch 47 thrown, the motor 4 will start to operate and in synchronized relation with such rotation, as well as the step-by-step lifting of the tool clear of the work. There is shifting of the work as the tool is lifted so that this sharpening or refining operation for the work is automatically effected. As the wheel or cutting tool 25 rotates, the lever system 15, 19, rocks the wheel 25 out of the work and in the transmission the tool is clear of the work. The wrist pin 39 as adjusted shifts the pusher to ride a tooth pitch distance and as the tool is again into the work the pusher recedes to repeat such operation.

What is claimed and it is desired to secure by Letters Patent is:

A portable saw blade sharpener comprising a bed plate adapted to be placed on a work bench or the like, a depending saw blade holder secured to the front edge thereof, a motor mounted on the rear of said plate, said motor having a shaft extending from each end thereof, a first lever pivotally mounted at one end on said bed plate adjacent to and extending at right angles to said motor, a grinding wheel journaled on the opposite end of said lever, a belt drive from the motor shaft to said wheel to rotate the same, a driven shaft mounted on said plate and extending at right angles to said motor shaft, a worm and gear connection between the driven shaft and the motor shaft, said driven shaft and first lever being in spaced relation and extending in the same direction from said motor, a second lever of the first class pivotally mounted on said plate and extending between said driven shaft and said first lever and engaging the latter, a cam on said driven shaft adapted to engage and oscillate said second lever to thereby oscillate said first lever to move said grinding wheel into and out of engagement with a saw blade, a saw feed pawl, means connecting said driven shaft with said pawl to actuate the pawl to intermittently feed the saw blade, said motor, levers, shafts and connecting parts being above said bed plate and in a substantially coplanar plane.

GEO. RAXLL.